US011989471B2

(12) United States Patent
Yamada

(10) Patent No.: US 11,989,471 B2
(45) Date of Patent: May 21, 2024

(54) COMPUTER-READABLE STORAGE MEDIUM, INFORMATION PROCESSING DEVICE, AND METHOD FOR PROVIDING NOTIFICATION ABOUT PARTICULAR PROCESSING

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/355,658

(22) Filed: Jul. 20, 2023

(65) Prior Publication Data

US 2023/0359416 A1 Nov. 9, 2023

Related U.S. Application Data

(63) Continuation of application No. PCT/JP2022/001538, filed on Jan. 18, 2022.

(30) Foreign Application Priority Data

Jan. 29, 2021 (JP) .................................. 2021-012776

(51) Int. Cl.
*G06F 3/12* (2006.01)
(52) U.S. Cl.
CPC .......... *G06F 3/1254* (2013.01); *G06F 3/1204* (2013.01); *G06F 3/1208* (2013.01); *G06F 3/1256* (2013.01); *G06F 3/12* (2013.01)
(58) Field of Classification Search
None
See application file for complete search history.

(56) References Cited

U.S. PATENT DOCUMENTS

2017/0264776 A1* 9/2017 Minami ............ H04N 1/32144
2018/0307448 A1 10/2018 Iwashita
(Continued)

FOREIGN PATENT DOCUMENTS

| JP | 2018051941 A | 4/2018 |
| JP | 2018176629 A | 11/2018 |
| JP | 2020087273 A | 6/2020 |

OTHER PUBLICATIONS

International Search Report dated Apr. 26, 2022 issued in PCT/JP2022/001538.

(Continued)

*Primary Examiner* — Darryl V Dottin
(74) *Attorney, Agent, or Firm* — Scully, Scott, Murphy & Presser, PC

(57) ABSTRACT

A non-transitory computer-readable storage medium stores computer-readable instructions that are executable by a computer of an information processing device and conform to a printer connected with the information processing device. The instructions cause, when executed by the computer, the information processing device to obtain automatic processing information stored in the printer, the automatic processing information indicating whether particular processing on image data of a print job is to be performed automatically. The instructions further cause, when executed by the computer, the information processing device to, in response to a print instruction to cause the printer to print a target image being output from an application program to a general-purpose print program, provide via a user interface a notification based on the automatic processing information and print settings specified by the print instruction, when the obtained automatic processing information indicates that the particular processing is to be performed automatically.

13 Claims, 7 Drawing Sheets

(56) References Cited

U.S. PATENT DOCUMENTS

2020/0084335 A1* 3/2020 Guidotti .............. G06F 21/1063
2020/0174724 A1 6/2020 Yamada

OTHER PUBLICATIONS

International Preliminary Report on Patentability and Written Opinion dated Jul. 31, 2023 issued in PCT/JP2022/001538 together with English language translations.

* cited by examiner

COMPUTER-READABLE STORAGE MEDIUM, INFORMATION PROCESSING DEVICE, AND METHOD FOR PROVIDING NOTIFICATION ABOUT PARTICULAR PROCESSING

REFERENCE TO RELATED APPLICATIONS

This application is a continuation of PCT International Application No. PCT/JP2022/001538 filed on Jan. 18, 2022, and claims priority from Japanese Patent Application No. 2021-012776 filed on Jan. 29, 2021, which is incorporated herein by reference in its entirety.

BACKGROUND ART

A technology has been known of a printer configured to, when having accepted input of forced print settings in advance and received a print job from an information processing device such as a personal computer, perform printing according to the forced print settings as accepted. For instance, a printer has been disclosed that is configured to accept an input as to whether to enable or disable a forced black-and-white printing function for forcibly changing color printing to black-and-white printing.

DESCRIPTION

In recent years, a technology has been put to practical use in which a printer is controlled by a print program that is incorporated as standard into an operating system (hereinafter referred to as an "OS") of an information processing device, without using a printer driver provided by a printer manufacturer. In this technology, the OS associates the printer with the OS-standard print program, and thereafter, the information processing device is enabled to cause the printer to perform printing with the OS-standard print program without using a printer driver in response to receipt of a print instruction to the printer.

The information processing device is configured to accept input of print settings using the OS-standard print program or a printer driver. Therefore, the user may set 2-in-1 printing on the information processing device, for instance, without knowing that a forced setting of 2-in-1 printing has been configured on the printer. In this case, image processing related to 2-in-1 printing is performed on both the information processing device and the printer, thereby resulting in 4-in-1 printing that is not intended by the user. In regard to this problem, the printer driver is configured to handle printer-specific custom settings such as forced print settings that are currently configured on the printer. For instance, the printer driver is enabled to provide to the printer a notification about the forced print settings that are currently configured on the printer. However, the OS-standard print program is unable to handle printer-specific custom settings and is more likely to cause user's unintended image processing as described above.

Aspects of the present disclosure are advantageous for providing one or more improved techniques for reducing the possibility of user's unintended printing when the user causes a printer, configured to accept input of forced print settings from an information processing device into which an OS-standard general-purpose print program is incorporated, to perform printing.

According to aspects of the present disclosure, a non-transitory computer-readable storage medium is provided, which stores computer-readable instructions that are executable by a computer of an information processing device and conform to a printer connected with the information processing device. The instructions are configured to, when executed by the computer, cause the information processing device to obtain automatic processing information stored in the printer. The automatic processing information indicates whether particular processing on image data of a print job is to be performed automatically. The printer is configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically. The instructions are further configured to, when executed by the computer, cause the information processing device to, in response to a print instruction to cause the printer to print a target image being output from an application program incorporated in the information processing device to a general-purpose print program incorporated in advance in an operating system of the information processing device, provide, via a user interface of the information processing device, a notification based on the obtained automatic processing information and print settings specified by the print instruction, when the obtained automatic processing information indicates that the particular processing is to be performed automatically.

According to aspects of the present disclosure, further provided is an information processing device that includes a user interface and a controller. The controller includes a processor and a non-transitory computer-readable storage medium. The non-transitory computer-readable storage medium stores an application program, a general-purpose print program, and computer-readable instructions. The general-purpose print program is incorporated in advance in an operating system of the information processing device. The instructions conform to a printer connected with the information processing device. The instructions are configured to, when executed by the processor, cause the controller to obtain automatic processing information stored in the printer. The automatic processing information indicates whether particular processing on image data of a print job is to be performed automatically. The printer is configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically. The instructions are further configured to, when executed by the processor, cause the controller to, in response to a print instruction to cause the printer to print a target image being output from the application program to the general-purpose print program, provide, via the user interface, a notification based on the obtained automatic processing information and print settings specified by the print instruction, when the obtained automatic processing information indicates that the particular processing is to be performed automatically.

According to aspects of the present disclosure, further provided is a method implementable by a processor executing computer-readable instructions on an information processing device. The instructions conform to a printer connected with the information processing device. The method includes obtaining automatic processing information stored in the printer. The automatic processing information indicates whether particular processing on image data of a print job is to be performed automatically. The printer is configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically. The method further includes providing, in response to a print instruction to cause the printer to print a target image being output from an application program incorporated in the information processing device to a general-purpose print program incorporated in advance in an operating system of the information processing device, a notification based on the obtained automatic processing information and print settings specified by the print instruction via a user interface of the information processing device, when the obtained automatic processing information indicates that the particular processing is to be performed automatically.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A detailed explanation will be provided below of a personal computer (hereinafter referred to as a "PC") using a support program in an illustrative embodiment according to aspects of the present disclosure, with reference to the accompanying drawings. In the present disclosure, a support program executable by the PC connected with a printer having a printing function is described.

Figure 1:
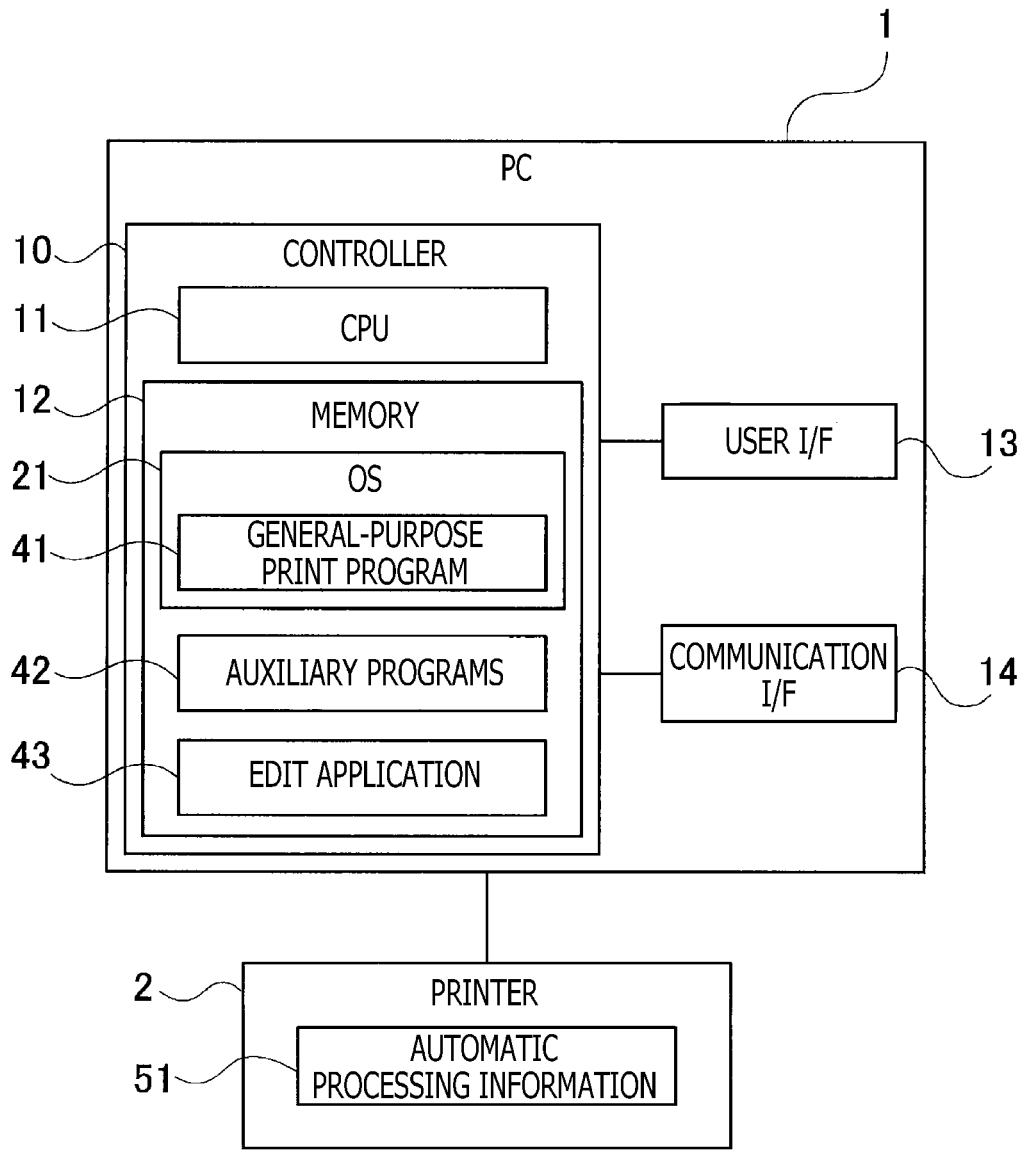
FIG. 1 is a block diagram schematically showing an electrical configuration of a PC.

As shown in FIG. 1, a PC 1 of the illustrative embodiment has a controller 10 that includes a CPU 11 and a memory 12. The PC 1 may be an example of an "information processing device" according to aspects of the present disclosure. The CPU 11 may be an example of a "processor" according to aspects of the present disclosure. The PC 1 further includes a user interface (hereinafter referred to as a "user I/F") 13 and a communication interface (hereinafter referred to as a "communication I/F") 14, which are electrically connected with the controller 10. The controller 10 shown in FIG. 1 is a collective term for hardware and software used to control the PC 1, and may not necessarily represent a single hardware element actually existing in the PC 1.

The CPU 11 is configured to perform various processes according to programs read from the memory 12 and based on user operations. The memory 12 stores various types of data and various programs including various application programs (hereinafter, which may be referred to as "applications"). The memory 12 is also used as a work area when various processes are performed. A buffer provided to the CPU 11 may be an example of a "memory" according to aspects of the present disclosure. Examples of the memory 12 are not limited to ROMs, RAMs, or HDDs, but may include storage media (e.g., CD-ROMs and DVD-ROMs) that are readable and writable by the CPU 11.

The user I/F 13 includes hardware configured to display screens to provide information to the user, and hardware configured to receive user operations. The user I/F 13 may have a combination of a display configured to display information, and a mouse and a keyboard that are configured to receive user input operations. The user I/F 13 may include a touch panel configured to display information and receive user input operations.

The communication I/F 14 includes hardware configured to communicate with external devices such as a printer 2. Communication standards applicable for the communication I/F 14 include Ethernet ("Ethernet" is a registered trademark of Fuji Xerox Co., Ltd.), Wi-Fi ("Wi-Fi" is a registered trademark of the non-profit Wi-Fi Alliance), and USB. The PC 1 may have a plurality of communication I/Fs 14 conforming to a plurality of communication standards.

As shown in FIG. 1, the memory 12 of the PC 1 stores an operating system (hereinafter referred to as an "OS") 21 including a general-purpose print program 41, and further stores auxiliary programs 42 and an edit application 43. The auxiliary programs 42 may be included in examples of a "support program" according to aspects of the present disclosure. The edit application 43 may be an example of an "application program" according to aspects of the present disclosure. Examples of the OS 21 may include Windows ("Windows" is a registered trademark of Microsoft Corporation), macOS ("macOS" is a registered trademark of Apple Inc.), Linux ("Linux" is a registered trademark of Linus Torvalds), iOS ("iOS" is a registered trademark of Cisco Systems, Inc.), and Android ("Android" is a registered trademark of Google LLC).

The general-purpose print program 41 is an OS-standard program for causing various types of printers (e.g., the printer 2) to perform printing based on user instructions. The general-purpose print program 41 in the illustrative embodiment is a program having a function to generate intermediate image data based on image data to be printed. For instance, the intermediate image data is XPS data.

The general-purpose print program 41 supports functions that are usable in common by a plurality of models of printers provided by a vendor of the various types of printers. The general-purpose print program 41 does not support all of the specific functions of the various types of printers. Functions supportable by the general-purpose print program 41 are limited to generic functions.

The auxiliary programs 42 include one program or a group of programs configured to, when executed by the CPU 11, cause the PC 1 to perform processing based on instructions from the OS 21, accompanying processing by the general-purpose print program 41. The auxiliary programs 42 include one or more applications that support control of a target hardware element. The auxiliary programs 42 in the illustrative embodiment conform to a model of the printer 2 connected with the PC 1. The auxiliary programs 42 are launched from the general-purpose print program 41, for instance, when the PC 1 has received an instruction to cause the printer 2 to perform printing using the general-purpose print program 41. For instance, the auxiliary programs 42 may be referred to as hardware support applications (abbreviation: HSAs).

The auxiliary programs 42 are configured to, when executed by the CPU 11, cause the PC 1 to accept a plurality of types of instructions from the general-purpose print program 41 and perform various types of processes based on the accepted instructions. The auxiliary programs 42 may include a combination of a plurality of programs each of which is configured to, when executed by the CPU 11, cause the PC 1 to accept execution instructions. The auxiliary programs 42 may include one program configured to, when executed by the CPU 11, cause the PC 1 to accept instructions and perform respective different processes according to the accepted instructions.

The auxiliary programs 42 may include a program prepared for each type of printer by the vendor of the various types of printers. For instance, the auxiliary programs 42 may include an auxiliary program prepared for inkjet printers and an auxiliary program prepared for laser printers. For instance, when a new printer is connected with the PC 1, the OS 21 causes the PC 1 to download an appropriate auxiliary program from a server or another source depending on a type of the connected printer and to incorporate the downloaded auxiliary program into the PC 1. The OS 21 then causes the PC 1 to store identification information of the incorporated auxiliary program in the memory 12 in association with printer information of the newly connected printer. It is noted that the auxiliary programs 42 may include not only the auxiliary program prepared for each type of printer but also an auxiliary program prepared for each model of printer or an auxiliary program prepared for each series of models of printers.

The edit application 43 is, for instance, an application for creating and editing image data and document data. For instance, the edit application 43 may be Microsoft Word or Microsoft PowerPoint, or may be an application provided by the vendor of the printer 2. "Microsoft" is a registered trademark of Microsoft Corporation. "PowerPoint" is a registered trademark of Microsoft Corporation. The edit application 43 is configured to accept user operations that include instructions to cause the printer 2 to perform particular operations. Specifically, for instance, the edit application 43 is configured to, when executed by the CPU 11, cause the PC 1 to accept, via the user I/F 13, a print execution instruction to cause the printer 2 to perform printing.

The printer 2 in the illustrative embodiment is a device having a printing function. The PC 1 is communicably connected with the printer 2 via the communication I/F 14. The printer 2 is configured to receive print data from an external device such as the PC 1 and perform printing based on the received print data.

The printer 2 in the illustrative embodiment has image processing functions to automatically perform image processing, and stores automatic processing information 51 is stored in a memory of the printer 2. The automatic processing information 51 indicates whether image processing on image data of a print job received by the printer 2 is to be performed automatically. When the automatic processing information 51 indicates that image processing is to be performed automatically, the printer 2 automatically performs image processing on the image data of the received print job using an image processing function of the printer 2, and performs printing based on the image-processed image data. In this case, the printer 2 performs image processing on the image data of the print job, regardless of the intention of the user who has submitted the print job or of the print settings configured for the print job. On the other hand, when the automatic processing information 51 indicates that image processing is not to be performed automatically, the printer 2 does not perform image processing and performs printing based on the image data of the received print job.

The image processing functions of the printer 2 include, for instance, an image composition function, an aggregating function, and a monochromatizing function. The image composition function is a function to combine a particular image (e.g., a watermark) with the image data of the received print job. The printer 2 previously stores particular images such as watermarks that are usable for the image composition function in the memory of the printer 2. The aggregating function is a function to reduce a plurality of pages of images contained in the image data of the received print job and arrange the reduced images in such a manner as to be included on a single sheet. The monochromatizing function is a function to delete color information contained in the image data of the received print job, thereby converting the image data into monochrome image data. The printer 2 in the illustrative embodiment may have image processing functions for a plurality of types of image processing.

Figure 2:
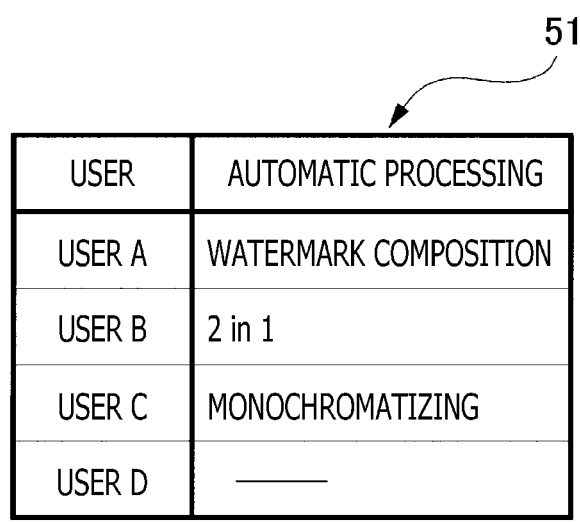
FIG. 2 shows an example of automatic processing information.

For instance, as shown in FIG. 2, the printer 2 in the illustrative embodiment stores, as the automatic processing information 51, information on image processing in association with identification information for identifying individual users of the printer 2. Based on the automatic processing information 51 and the user identification information included in the received print job, the printer 2 determines whether to automatically perform image processing and, if the printer 2 performs, which process to perform. Since different types of automatic processing are settable for individual users as the automatic processing information 51, each user is allowed to cause the printer 2 to forcibly perform particular image processing.

The automatic processing information 51 of the printer 2 is set in advance, for instance, by an administrator of the printer 2. For instance, the printer 2 in the illustrative embodiment accepts, in advance, the automatic processing information 51 input by the administrator via an operation panel, and stores the automatic processing information 51 in the memory of the printer 2. For instance, the printer 2 may accept the designation of the automatic processing information 51 in combination with a password for the administrator. In this case, the printer 2 may not accept changes in the automatic processing information 51 unless the password is entered.

The automatic processing information 51 may include information on image processing corresponding to a guest user. In this case, when the printer 2 receives a print job from a user whose identification information is not stored in the automatic processing information 51, or when the received print job does not include the identification information of the user who has submitted the print job, the printer 2 may determine that the received print job is a print job from a guest user and determine image processing corresponding to the guest user. In another instance, the printer 2 may not perform printing based on a print job from a user whose identification information is not included in the automatic processing information 51.

Figure 3A:
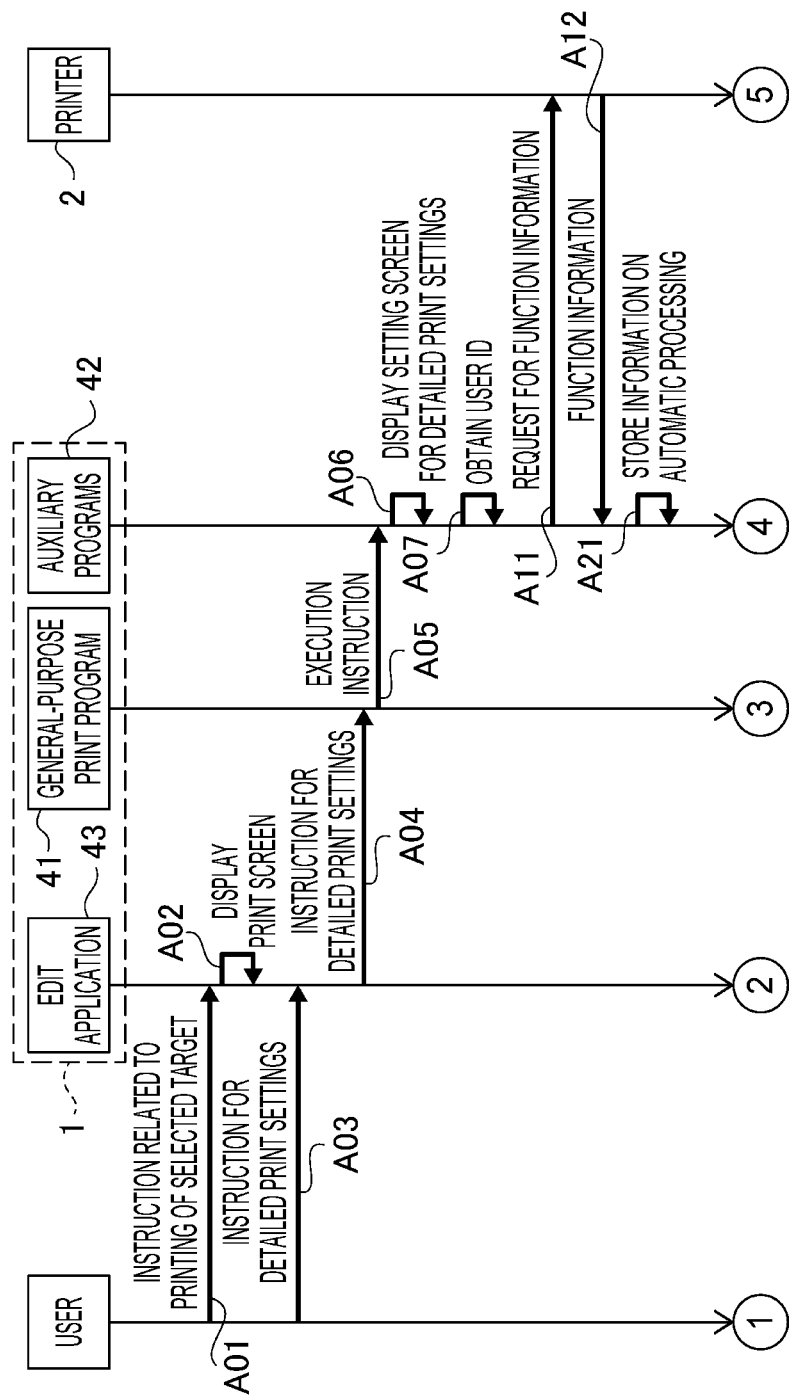
FIGS. 3A and 3B are sequence charts showing an example procedure of printing operations by individual programs.
Figure 3B:
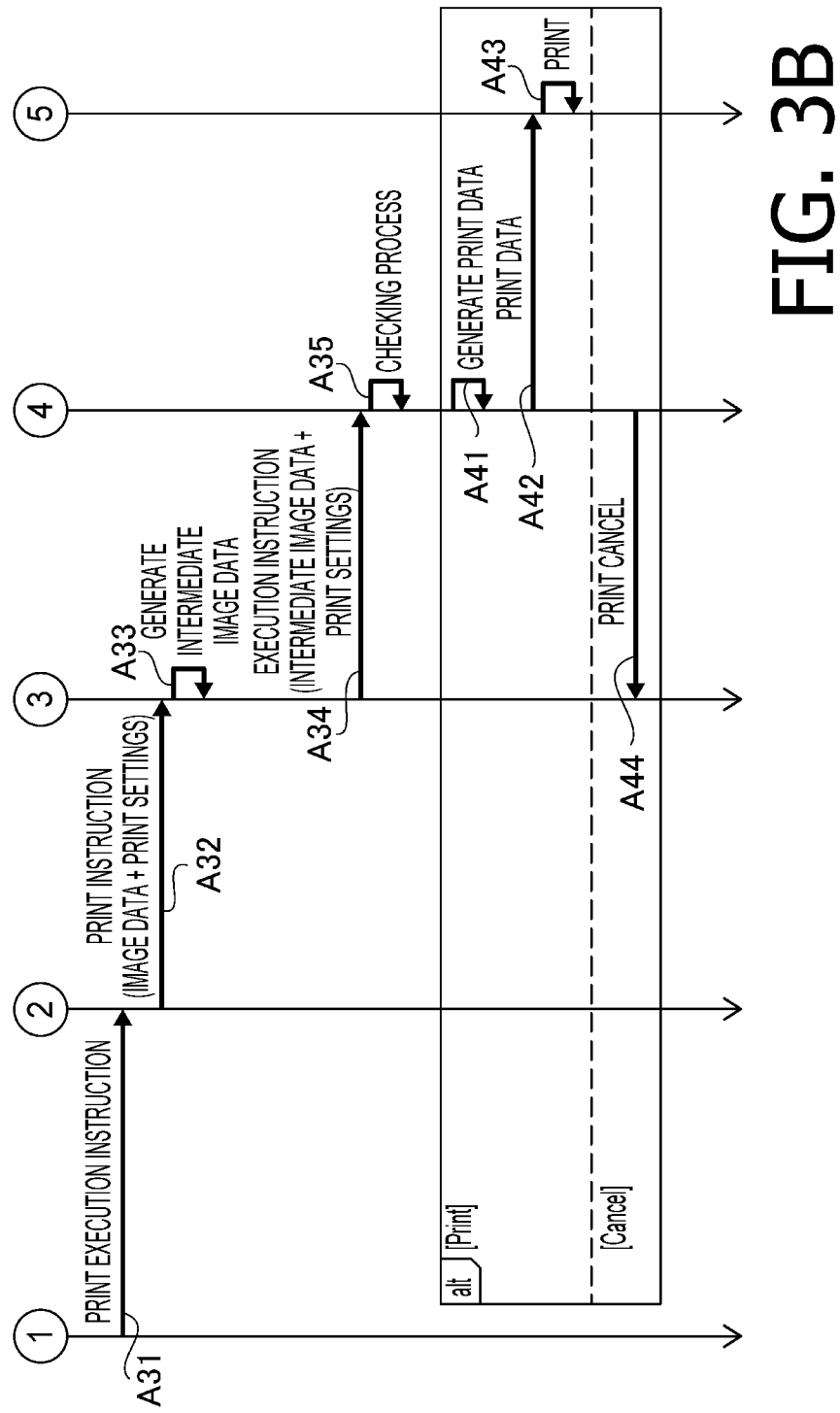

Next, a printing procedure including operations by the auxiliary programs 42 in the illustrative embodiment will be described with reference to FIGS. 3A and 3B. FIGS. 3A and 3B shows operations when the PC 1, in which the auxiliary programs 42 conforming to the printer 2 are incorporated, causes the printer 2 to perform printing using the general-purpose print program 41, by an application (e.g., the edit application 43) to receive a print instruction.

Each processing step in the processes and flowchart(s) in the illustrative embodiment basically indicates processing by the CPU 11 according to instructions described in programs such as the auxiliary programs 42. Processing by the CPU 11 also includes hardware control using an API of the OS 21. In the present disclosure, operations by each program may be described without a detailed explanation of the OS 21. In addition, "obtaining" and "acquiring" may be used as concepts that do not necessarily require a request.

The edit application 43 is configured to accept creating and editing of text, charts, figures, and other information based on user's instructions. In response to receiving an instruction related to printing of currently selected target (e.g., text, a chart, or a figure) (A01), the edit application 43 causes the user I/F 13 to display a print screen for receiving user instructions (A02). For instance, the edit application 43 receives, via the print screen, a print execution instruction, an instruction for basic print settings, and an instruction to start accepting detailed print settings.

When the edit application 43 has received an instruction to start accepting detailed print settings while the printer 2 is selected on the print screen being displayed (A03), the edit application 43 passes information on the received instruction to start accepting detailed print settings to the OS 21. When the OS 21 has received the information on the instruction to start accepting detailed print settings for printing using the general-purpose print program 41, the OS 21 activates the general-purpose print program 41 and provides the instruction to start accepting detailed print settings to the general-purpose print program 41 (A04). In response to receiving the instruction to start accepting detailed print settings, the general-purpose print program 41 provides an execution instruction to accept detailed print settings to the auxiliary programs 42 conforming to the printer 2 as currently selected (A05).

Figure 4:
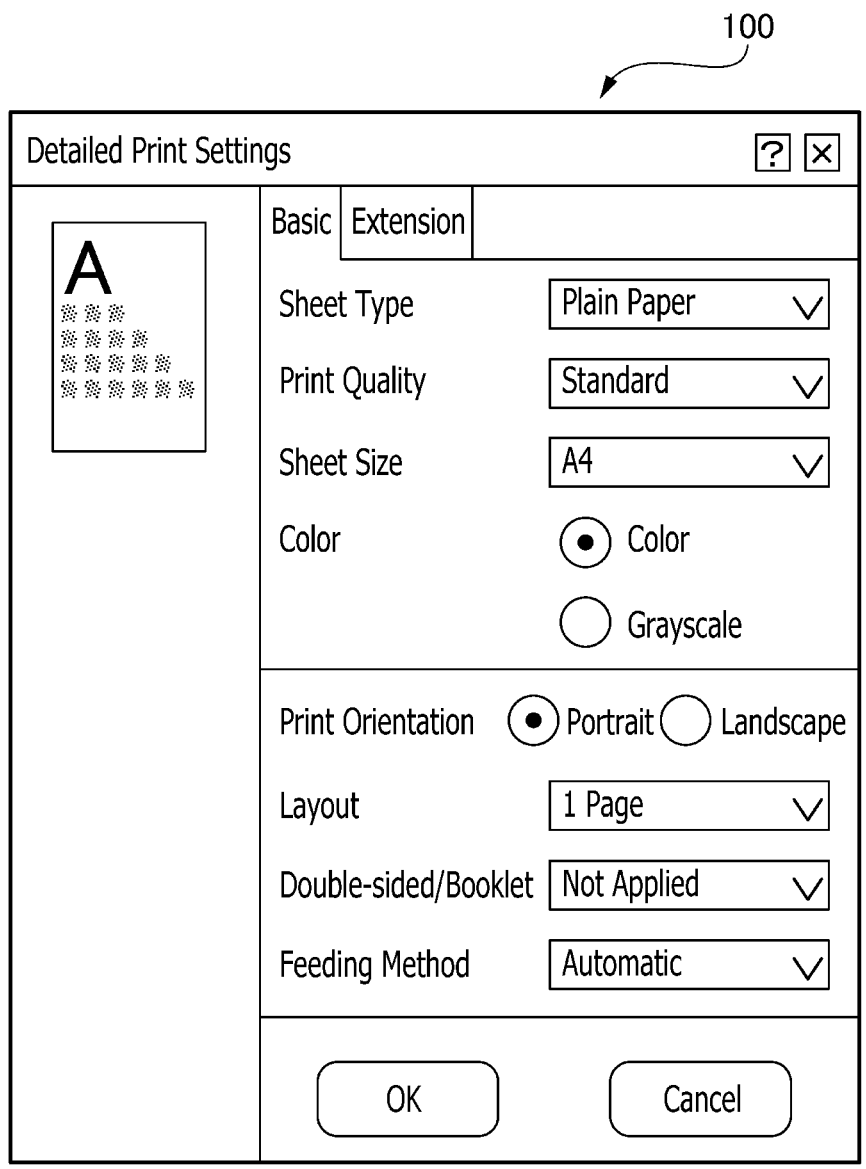
FIG. 4 shows an example of a setting screen.

The auxiliary programs 42 start operating based on the execution instruction from the general-purpose print program 41, and cause the user I/F 13 to display a setting screen to receive input operations for detailed print settings (A06). For instance, as shown in FIG. 4, based on model information on the model of the printer 2, the auxiliary programs 42 cause the user I/F 13 to display a setting screen 100 to accept detailed print settings conformable to the model of the printer 2, and receive user operations.

In addition, the auxiliary programs 42 obtain a user ID that indicates the user who is currently logged in to the PC 1 (A07). The user ID is, for instance, a user name and is identification information for identifying the user. For instance, the auxiliary programs 42 may obtain the user ID from the OS 21, or may inquire, in A07, of the user about the user ID and receive input of the user ID.

When having caused the user I/F 13 to display the setting screen 100 in A06, the auxiliary programs 42 send an obtainment request for function information to the printer 2 via the communication I/F 14 (A11). In A11, the auxiliary programs 42 send the obtainment request with information on the user ID obtained in A07 added.

In response to the obtainment request in A11, the printer 2 reads out information on automatic processing corresponding to the user ID added to the obtainment request from the automatic processing information 51 and sends the function information including the information on the automatic processing to the PC 1. Thereby, the auxiliary programs 42 receive the function information from the printer 2 (A12). From the function information received in A12, the auxiliary programs 42 may obtain the information on the automatic processing that is set in association with the currently logged in user. Further, the auxiliary programs 42 store the information on the automatic processing corresponding to the currently logged in user in an available area of the memory 12 (A21).

The auxiliary programs 42 may communicate directly with the printer 2, for instance, using MIB ("MIB" is an abbreviation for "Management Information Base"), or may communicate therewith via the OS 21. When the auxiliary programs 42 and the printer 2 communicate with each other via the OS 21, the auxiliary programs 42 and the printer 2 perform communication conforming to a communication protocol of the OS 21, such as IPP ("IPP" is an abbreviation for "Internet Printing Protocol").

The auxiliary programs 42 receive user operations to specify various print settings via the setting screen 100 being displayed. When having received an instruction to terminate configuration of the detailed settings on the setting screen 100, the auxiliary programs 42 terminate the display of the setting screen 100 and pass a termination notification to the general-purpose print program 41. Before terminating the display of the setting screen 100, the auxiliary programs 42 may store information regarding the print settings specified by the user instruction in an area of the memory 12 that is usable by the auxiliary programs 42. In response to receiving the termination notification from the auxiliary programs 42, the general-purpose print program 41 passes the termination notification to the edit application 43.

In response to receiving the termination notification from the general-purpose print program 41, the edit program 43 is brought into a state where user operations are acceptable on the print screen displayed in A02. Then, in response to receiving a print execution instruction from the user via the print screen (A31), the edit application 43 provide a print instruction to the general-purpose print program 41 (A32). The general-purpose print program 41 obtains information indicating image data of a target image to be printed and information indicating the print settings in the print instruction. The print settings contained in the information passed from the edit application 43 to the general-purpose print program 41 are print settings specified by the user who has provided the print instruction, and do not include information on automatic image processing to be performed by the printer 2 based on automatic processing information 51.

The general-purpose print program 41 generates intermediate image data by converting a format of the image data included in the received print instruction to a format of intermediate image data (A33), and generates a print job including the intermediate image data. The edit application 43 includes various types of image data. The general-purpose print program 41 converts the received image data into intermediate image data suitable for generating print data. If the image data included in the print instruction is suitable for generating print data, the image data may be used as is as the intermediate image data without being converted.

The general-purpose print program 41 further provides an execution instruction to the auxiliary programs 42 (A34), and activates the auxiliary programs 42. Through the execution instruction, the generated intermediate image data and information on the print settings are passed to the auxiliary programs 42. Namely, the auxiliary programs 42 obtains the intermediate image data from the OS 21 in A34.

Figure 5:
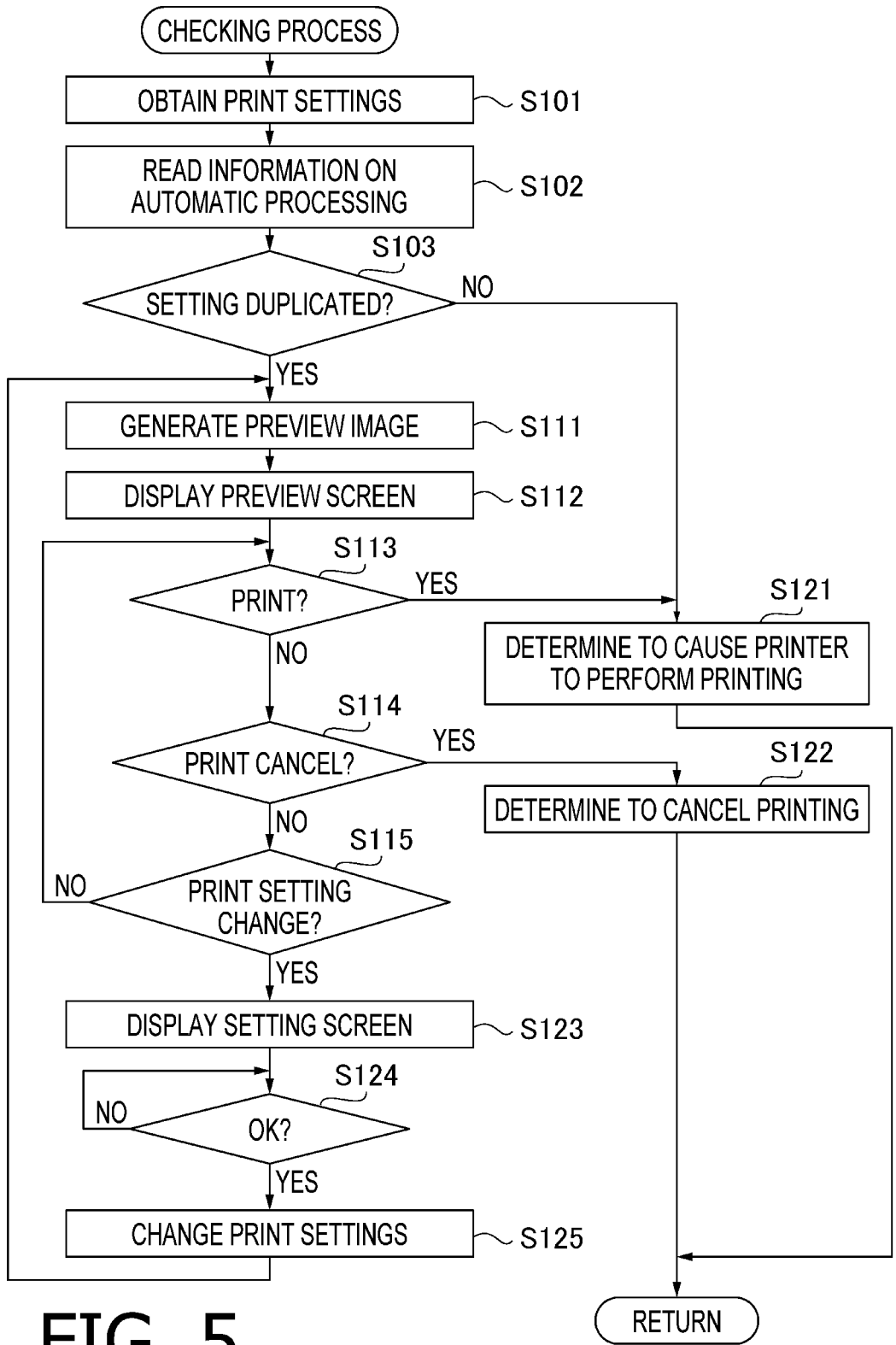
FIG. 5 is a flowchart showing a procedure of a checking process.

Further, the auxiliary programs 42 performs a checking process (A35). The checking process is a process to provide, when the automatic processing is set on the printer 2, a notification about the information on the set automatic processing to the user, thereby allowing the user to check a print result prior to execution of printing. A procedure of the checking process will be described with reference to a flowchart shown in FIG. 5. The checking process is a process to be performed by the CPU 11 of the PC 1 with the auxiliary programs 42.

In the checking process, the CPU 11 obtains information on the print settings that have been provided from the general-purpose print program 41 to the auxiliary programs 42 in A34 of FIG. 3B (S101). Then, CPU 11 reads out the information on the automatic processing stored in the memory 12 (S102).

If the edit application 43 has not received the aforementioned instruction for the detailed print settings in A03 of FIG. 3A, the auxiliary programs 42 may not execute A11-A12. In this case, no information on the automatic processing is stored in the memory 12 at the time when the checking process begins to be performed. When no information on the automatic processing is stored in the memory 12 at the start of the checking process, the auxiliary programs 42 communicate with the printer 2 after the start of the checking process and obtains the information on the automatic processing from the printer 2. Thus, when the information on the automatic processing is obtained after the receipt of the print instruction, it is possible to perform the automatic processing based on the latest automatic processing information 51. On the other hand, when the information on the automatic processing is obtained based on the display of the setting screen 100 for accepting the detailed settings and is stored in the memory 12, and the automatic processing information 51 is read out from the memory 12 based on the print instruction, it is possible to complete the processing following the receipt of the print instruction earlier than when the auxiliary programs 42 communicate with the printer 2 at the timing when the print instruction has been received.

Then, the CPU 11 determines whether there is a duplicated setting for the same setting item, based on the print settings obtained in S101 and the information on the automatic processing read out in S102 (S103). For instance, in the example shown in FIG. 2, if the currently logged in user is User B, 2-in-1 processing is set as the automatic processing. The setting of 2-in-1 is a setting for a setting item of aggregate printing. If this user provides a print instruction for a print job that includes a setting (e.g., 2-in-1) for the setting item of aggregate printing via the setting screen 100 shown in FIG. 4, the settings for the setting item of aggregate printing will be included in both the information on the automatic processing and the print settings. In this case, the CPU 11 makes an affirmative determination in S103 (i.e., S103: Yes).

In response to determining that there is a duplicated setting for the same setting item (S103: Yes), the CPU 11 generates a preview image based on the print settings and the information on the automatic processing (S111). Then, the CPU 11 causes the user I/F 13 to display a preview screen including the generated preview image (S112).

Figure 6:
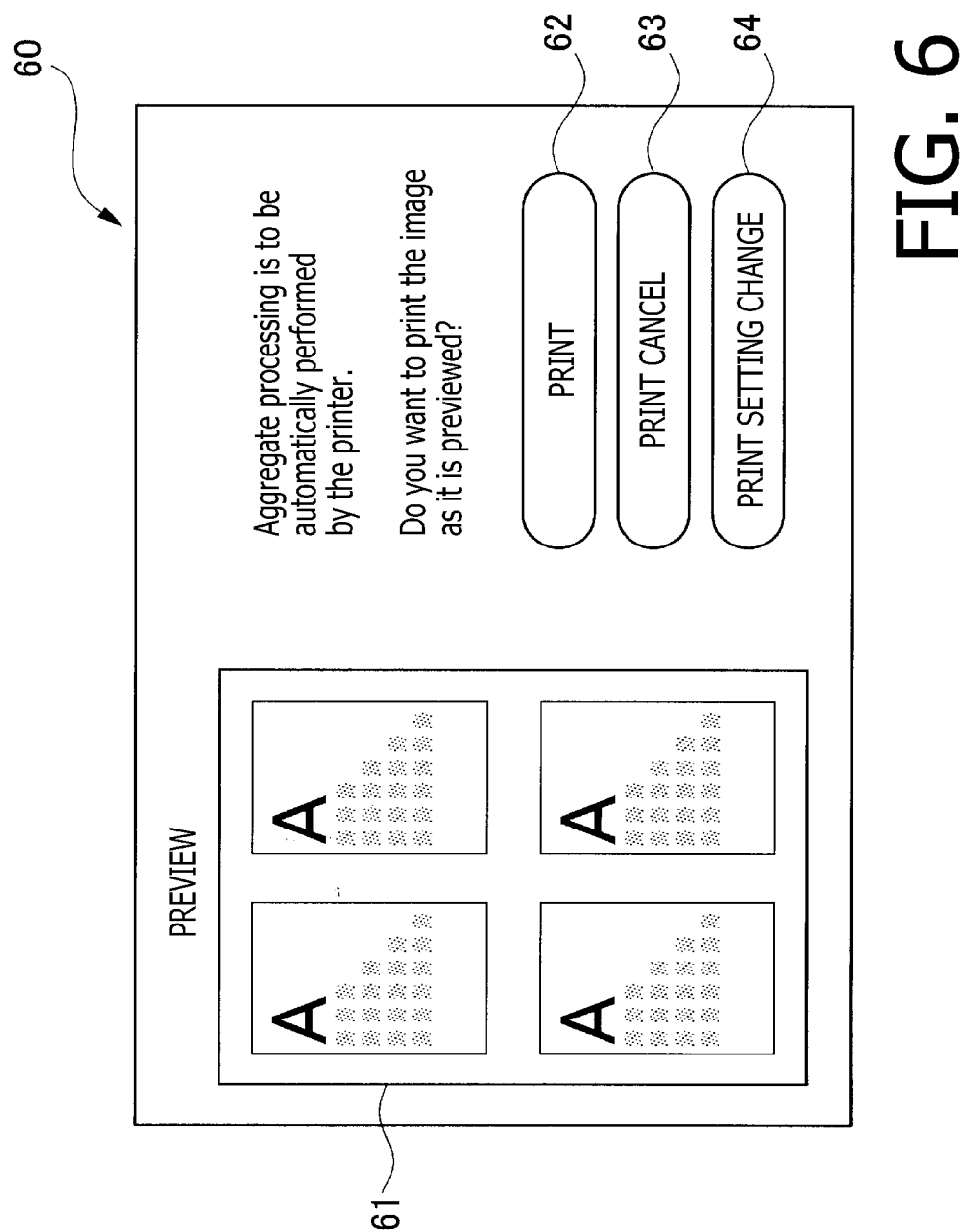
FIG. 6 shows an example of a preview screen.

FIG. 6 shows an example of the preview screen. The preview screen 60 shown in FIG. 6 is an example in the case where 2-in-1 is set for both the print settings and the automatic processing. The preview screen 60 includes a preview image 61, a print button 62, a print cancel button 63, and a print setting change button 64. The automatic processing included in the automatic processing information 51 is a process to be performed without involving the general-purpose print program 41. Therefore, when printing is performed in the situation where 2-in-1 is set for both the print settings and the automatic processing, an image obtained by performing 4-in-1 processing on the original image data is printed, as shown in the preview image 61 in FIG. 6. By displaying the preview image 61 as an image resulting from the automatic processing, the user is allowed to check the printed image in advance on the user I/F13 of the PC 1.

The CPU 11 receives an operation to the print button 62 or the print cancel button 63 or the print setting change button 64 on the preview screen 60 being displayed. The CPU 11 determines whether an operation to the print button 62 has been received on the preview screen 60 being displayed (S113). In response to determining that an operation to the print button 62 has not been received (S113: No), the CPU 11 determines whether an operation to the print cancel button 63 has been accepted (S114). In response to determining that an operation to the print cancel button 63 has not been received (S114: No), the CPU 11 determines whether an operation to the print setting change button 64 has been received (S115). In response to determining that an operation to the print setting change button 64 has not been received (S115: No), the CPU 11 waits until an operation to one of the buttons 62, 63, and 64 is received.

In response to determining that an operation to the print button 62 has been received on the preview screen 60 (S113: Yes) or determining that there is no duplicated setting for the same setting item between the print settings and the automatic processing (S103: No), the CPU 11 determines to cause the printer 2 to perform printing (S121). Thereafter, the CPU 11 terminates the checking process and returns to the procedure shown in FIGS. 3A and 3B. Thus, when the image processing based on the print settings specified by the print instruction does not overlap with the image processing based on the automatic processing information 51, duplicate image processing is not performed. In the illustrative embodiment, it is possible to avoid annoying the user with an unnecessary notification. When the automatic processing corresponding to the currently logged in user is not set, as well, the CPU 11 makes the negative determination in S103 (i.e., S103: No).

In response to determining that an operation to the print cancel button 63 has been received (S114: Yes), the CPU 11 determines to cancel printing (S122). Thereafter, the CPU 11 terminates the checking process and returns to the procedure shown in FIGS. 3A and 3B. Thus, by accepting the cancellation of the print job while the preview image 61 is being displayed, it is possible to avoid printing unintended by the user.

On the other hand, in response to determining that an operation to the print setting change button 64 has been received (S115: Yes), the CPU 11 causes the user I/F 13 to display the setting screen 100 as shown in FIG. 4 (S123), thereby enabling the PC 1 to accept input via the setting screen 100.

Then, the CPU 11 determines whether an operation to the OK button has been received on the setting screen 100 (S124). In response to determining that an operation to the OK button has not been received (S124: No), the CPU 11 waits for a user operation to the OK button to be received. In response to determining that an operation to the OK button has been received (S124: Yes), the CPU 11 changes the print settings based on the setting screen 100 being displayed (S125). Further, the CPU 11 returns to S111 to regenerate and display a preview image based on the changed print settings and the information on the automatic processing. By accepting changes in the print settings as the preview image 61 is displayed, it is possible to reduce the risk of printing unintended by the user.

Referring back to FIG. 3B, in response to determining, in the checking process, to cause the printer 2 to perform printing (alt: [Print]), the auxiliary programs 42 generate print data based on the intermediate image data received from the OS 21 in A34 (A41). The print data generated in A41 is data in such a format as to be usable for printing of an image resulting from the automatic processing by the printer 2, and is, for instance, PDL data dedicated to the model of the printer 2.

Thus, when the print data is generated by the auxiliary programs 42 conforming to the printer 2, it is possible to achieve a higher degree of freedom of processing executable by the printer 2 and a lower processing load on the printer 2 than when the print data is generated by the general-purpose print program 41.

Instead of the auxiliary programs 42 generating the print data, the general-purpose print program 41 may generate the print data. Namely, the auxiliary programs 42 may pass the intermediate image data and information on the execution of printing to the general-purpose print program 41. The general-purpose print program 41 may generate print data based on the intermediate image data received from the auxiliary programs 42, and may pass the generated print data to the auxiliary programs 42.

The print data generated by the general-purpose print program 41 is print data in a format usable for printing by various types of printers, such as PWG-Raster data or PDF data. When the print data is generated by the general-purpose print program 41, the auxiliary programs 42 are responsible for less processing. Therefore, in this case, it is possible to avoid an increase in processing time and to reduce the program size of the auxiliary programs 42. In this case, however, the printer 2 needs to have the capability to automatically process and print the print data generated by the general-purpose print program 41.

Further, the auxiliary programs 42 send the generated print data to the printer 2 together with a print command for instructing the printer 2 to perform printing (A42). The printer 2, which has received the print data and the print command, prints the image of the print data based on the received print command (A43). At this time, as described above, the printer 2 automatically performs image processing based on the automatic processing information 51. As a result, a printed material is generated.

After sending the print data to the printer 2 in A42, the auxiliary programs 42 provide a notification that the transmission of the print data has been completed to the general-purpose print program 41. Thereby, the general-purpose print program 41 terminates processing of the print job based on the print instruction received in A32.

The transmission of the print data to the printer 2 may be performed by the general-purpose print program 41. In other words, the auxiliary programs 42 may pass the generated print data to the general-purpose print program 41 in such a manner that the print data is to be transmitted from the PC 1 with the printer 2 as the transmission destination. The general-purpose print program 41 may send the print data received from the auxiliary programs 42 to the printer 2.

The printer 2 may have a function to rasterize the intermediate image data. If the printer 2 has the function to rasterize the intermediate image data, the auxiliary programs 42 may send to the printer 2 a print command including the intermediate image data of the target image to be printed, without generating the print data of the target image to be printed.

On the other hand, in response to determining, in the checking process, to cancel printing (alt: [Cancel]), the auxiliary programs 42 provide a notification to cancel the print job to the general-purpose print program 41 (A44). Thereby, the general-purpose print program 41 cancels the print job based on the print instruction received in A32 and terminates processing for printing.

As described in detail above, according to the auxiliary programs 42 in the illustrative embodiment, the PC 1 obtains the information on the automatic processing based on the automatic processing information 51 stored in the printer 2, and in response to receipt of a print instruction, provides a notification based on the obtained information on the automatic processing and the print settings configured by the user. Thereby, the user is allowed to recognize in advance a printed image based on the print instruction, and to avoid printing (e.g., printing of an image resulting from duplicated image processing) unintended by the user.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

For instance, examples of the device connected with the PC 1 are not limited to the printer 2, but may include any devices having the printing function, such as multi-function peripherals, copiers, and fax machines. The number of printers connected with the PC 1 is not limited to the example (i.e., one) shown in the aforementioned illustrative embodiment, but may be two or more.

Further, for instance, the PC 1 may obtain the automatic processing information 51 not only from the printer 2 but also from another external device such as a server that is communicably connected with the PC 1. For instance, the PC 1 may be connected with the printer 2 and a server, and the server may have the automatic processing information 51 of the printer 2. In such a case, the auxiliary programs 42 may send a request for the automatic processing information 51 of the printer 2 to the server in A11 (see FIG. 3A), thereby obtaining the automatic processing information 51 of the printer 2 from the server in A12.

All the display screens shown in the drawings are merely examples, and practicable examples according to aspects of the present disclosure are not limited thereto. For instance, practicable examples of the arrangement and number of images shown on each display screen are not limited to the examples shown above. Likewise, practicable examples of the arrangement and number of the buttons shown on each display screen are not limited to the examples shown above. In the aforementioned illustrative embodiment, the preview screen 60 is configured to receive instructions thereon, such as an instruction to change the print settings and an instruction to cancel printing. However, the preview screen 60 may not be configured to receive such instructions.

In the aforementioned illustrative embodiment, the preview screen 60 is displayed when there is a duplicated setting for the same setting item between the automatic processing and the print settings. However, practicable examples according to aspects of the present disclosure are not limited thereto. For instance, the preview screen 60 may be displayed when some type of automatic processing is set. Further, for instance, the preview screen 60 may be displayed even when no automatic processing is set, or there is no duplicated setting for the same setting item between the automatic processing and the print settings. The preview screen 60 including the preview image 61 in the aforementioned illustrative embodiment may be an example of a "notification" (e.g., a notification to be provided when there is a duplicated setting for the same setting item between the automatic processing and the print settings) according to aspects of the present disclosure. However, practicable examples of the "notification" according to aspects of the present disclosure may include a notification that does not include an image. For instance, the user may be notified of the type of the automatic processing to be performed, by sounds or displayed text.

The types of automatic processing illustrated in the aforementioned illustrative embodiment are merely examples, and practicable examples according to aspects of the present disclosure are not limited thereto. For instance, the printer 2 may have only one type of automatic processing function. In such a case, the automatic processing information 51 may store only information indicating whether the automatic processing for each user is to be performed. In the aforementioned illustrative embodiment, the information on a corresponding type of automatic processing is stored, as the automatic processing information 51, in association with each user ID. However, for instance, a particular type of automatic processing may be set to be performed uniformly for all users. In this case, the user information is not needed to make a determination about the automatic processing, and the auxiliary programs 42 may not obtain the user ID. Thus, a common type of automatic processing may be set for all printing processes using the printer 2. Additionally, there is no need for the automatic processing information 51 to have information for each user. In this case, the automatic processing information 51 needs only to have information indicating the type of the automatic processing to be performed, thus providing a more user-friendly system that includes the PC 1 and the printer 2.

In the aforementioned illustrative embodiment, when the information on the corresponding type of automatic processing for each user is stored as the automatic processing information 51, the auxiliary programs 42 send the obtainment request with the information on the user ID added, and the printer 2 sends the requested information corresponding to the logged-in user in response to the obtainment request. However, practicable examples according to aspects of the present disclosure are not limited thereto. For instance, the printer 2 may send the automatic processing information 51 for all users in response to the obtainment request. The auxiliary programs 42 may extract the information corresponding to the logged-in user from the received automatic processing information 51. In this case, there is no need to add the information on the user ID to the obtainment request. The auxiliary programs 42 may obtain the user ID after receiving the automatic processing information 51.

The function information obtained by the auxiliary programs 42 in A11 may include not only the automatic processing information 51 but also, for instance, information regarding the capability of the printer 2. The auxiliary programs 42 may cause the user I/F 13 to display screens for accepting user settings based on various types of information obtained from the printer 2. In the illustrative embodiment, only the printing operation has been described in detail as an operation by the auxiliary programs 42. However, the auxiliary programs 42 may have other additional roles. The programs for executing the processes in the illustrative embodiment are not limited to the auxiliary programs 42, but may be any programs configured to accept instructions from the OS 21 or the general-purpose print program 41 when printing is performed using the general-purpose print program 41. Examples of the programs for executing the processes according to aspects of the present disclosure may include a print workflow application (Print workflow) of which the specifications have been disclosed by Microsoft Corporation.

The timing at which the auxiliary programs 42 are executed is not limited to the example illustrated in the illustrative embodiment. For instance, the auxiliary programs 42 may be executed directly by an execution instruction from the OS 21, or may be resident programs. When the auxiliary programs 42 are resident programs, the auxiliary programs 42 may perform the aforementioned operations in response to receiving execution instructions.

In any flowchart disclosed in the illustrative embodiment, a plurality of processes in any plurality of steps may be arbitrarily changed in the execution order or may be executed in parallel, to the extent that there is no inconsistency in processing results.

The processes disclosed in the illustrative embodiment may be executed by one or more CPUs, one or more hardware elements such as ASICs, or a combination of at least two elements selected from those elements (including the CPUs and the hardware elements). The processes disclosed in the illustrative embodiment may be implemented in various aspects, such as a method and a non-transitory computer-readable storage medium storing computer-readable instructions for performing the processes.

The following shows examples of associations between elements illustrated in the aforementioned illustrative embodiment(s) and modification(s), and elements claimed according to aspects of the present disclosure. For instance, the PC 1 may be an example of an "information processing device" according to aspects of the present disclosure. The controller 10 may be an example of a "controller" according to aspects of the present disclosure. The CPU 11 may be an example of a "computer" according to aspects of the present disclosure. The CPU 11 may be an example of a "processor" according to aspects of the present disclosure. The memory 12 may be an example of a "non-transitory computer-readable storage medium" according to aspects of the present disclosure. The memory 12 may be an example of a "memory" according to aspects of the present disclosure. The user I/F 13 may be an example of a "user interface" according to aspects of the present disclosure. The auxiliary programs 42 may be an example of "computer-readable instructions" according to aspects of the present disclosure. The edit application 43 may be an example of an "application program" according to aspects of the present disclosure. The general-purpose print program 41 may be an example of a "general-purpose print program" according to aspects of the present disclosure. The printer 2 and the server 3 may be included in examples of an "external device" according to aspects of the present disclosure.

What is claimed is:

1. A non-transitory computer-readable storage medium storing computer-readable instructions that are executable by a computer of an information processing device and conform to a printer connected with the information processing device, the instructions being configured to, when executed by the computer, cause the information processing device to:
    obtain automatic processing information stored in the printer, the automatic processing information indicating whether particular processing on image data of a print job is to be performed automatically, the printer being configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically; and
    in response to a print instruction to cause the printer to print a target image being output from an application program incorporated in the information processing device to a general-purpose print program incorporated in advance in an operating system of the information processing device, provide, via a user interface of the information processing device, a notification based on the obtained automatic processing information and print settings specified by the print instruction, when the obtained automatic processing information indicates that the particular processing is to be performed automatically.

2. The non-transitory computer-readable storage medium according to claim 1,
    wherein the instructions are further configured to, when executed by the computer, cause the information processing device to:
        send an obtainment request for the automatic processing information to the printer, thereby causing the printer to send the automatic setting information to the information processing device in response to the obtainment request from the information processing device; and
        receive the automatic setting information from the printer, thereby obtaining the automatic setting information.

3. The non-transitory computer-readable storage medium according to claim 1,
    wherein the instructions are further configured to, when executed by the computer, cause the information processing device to, in response to the print instruction being output from the application program to the general-purpose print program, provide the notification via the user interface when the print settings specified by the print instruction include a setting of the particular processing.

4. The non-transitory computer-readable storage medium according to claim 1,
    wherein the instructions are further configured to, when executed by the computer, cause the information processing device to display, on the user interface, a preview image representing the target image to be printed, based on the obtained automatic processing information and the print settings specified by the print instruction, thereby providing the notification.

5. The non-transitory computer-readable storage medium according to claim 1,
    wherein the instructions are further configured to, when executed by the computer, cause the information processing device to, after providing the notification, accept a change in the print settings via the user interface.

6. The non-transitory computer-readable storage medium according to claim 1,
    wherein the instructions are further configured to, when executed by the computer, cause the information processing device to:
        accept, via the user interface, a selection as to whether to cancel the print job based on the print instruction; and
        cancel the print job in response to accepting a selection to cancel the print job.

7. The non-transitory computer-readable storage medium according to claim 1,
    wherein the instructions are further configured to, when executed by the computer, cause the information processing device to:
        display, on the user interface, a setting screen configured to accept an input operation for the print settings;
        after displaying the setting screen, obtain the automatic processing information and store the obtained automatic processing information in a memory of the information processing device; and
        provide the notification via the user interface when the automatic processing information stored in the memory indicates that the particular processing is to be performed automatically.

8. The non-transitory computer-readable storage medium according to claim 1,
    wherein the instructions are further configured to, when executed by the computer, cause the information processing device to, in response to the print instruction being output from the application program to the general-purpose print program, obtain the automatic processing information.

9. The non-transitory computer-readable storage medium according to claim 1,
    wherein the printer stores, as the automatic processing information, information on a corresponding type of processing associated with each identification information, and
    wherein the instructions are further configured to, when executed by the computer, cause the information processing device to:
        obtain identification information for identifying a particular user; and
        obtain, as the automatic processing information, information on the particular processing associated with the obtained identification information.

10. The non-transitory computer-readable storage medium according to claim 1,
    wherein the instructions are further configured to, when executed by the computer, cause the information processing device to obtain the automatic processing information that indicates whether, as the particular processing, image processing of combining a watermark image with the target image to be printed is to be performed automatically.

11. The non-transitory computer-readable storage medium according to claim 1,
wherein the instructions are further configured to, when executed by the computer, cause the information processing device to obtain the automatic processing information that indicates whether, as the particular processing, image processing of reducing a plurality of pages of images and aggregating the reduced images on a single sheet is to be performed automatically.

12. An information processing device comprising:
a user interface; and
a controller including:
   a processor; and
   a non-transitory computer-readable storage medium storing an application program, a general-purpose print program incorporated in advance in an operating system of the information processing device, and computer-readable instructions conforming to a printer connected with the information processing device, the instructions being configured to, when executed by the processor, cause the controller to:
   obtain automatic processing information stored in the printer, the automatic processing information indicating whether to particular processing on image data of a print job is to be performed automatically, the printer being configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically; and
   in response to a print instruction to cause the printer to print a target image being output from the application program to the general-purpose print program, provide, via the user interface, a notification based on the obtained automatic processing information and print settings specified by the print instruction, when the obtained automatic processing information indicates that the particular processing is to be performed automatically.

13. A method implementable by a processor executing computer-readable instructions on an information processing device, the instructions conforming to a printer connected with the information processing device, the method comprising:
   obtaining automatic processing information stored in the printer, the automatic processing information indicating whether particular processing on image data of a print job is to be performed automatically, the printer being configured to, in response to receiving the print job, perform the particular processing on the image data of the print job and perform printing based on the image data on which the particular processing has been performed, when the automatic processing information indicates that the particular processing is to be performed automatically, whereas performing printing based on the image data without performing the particular processing when the automatic processing information indicates that the particular processing is not to be performed automatically; and
   in response to a print instruction to cause the printer to print a target image being output from an application program incorporated in the information processing device to a general-purpose print program incorporated in advance in an operating system of the information processing device, providing, via a user interface of the information processing device, a notification based on the obtained automatic processing information and print settings specified by the print instruction, when the obtained automatic processing information indicates that the particular processing is to be performed automatically.

* * * * *